United States Patent
Warashina et al.

(10) Patent No.: US 7,392,643 B2
(45) Date of Patent: Jul. 1, 2008

(54) MULCHING SYSTEM FOR A LAWN MOWER

(75) Inventors: Makoto Warashina, Ormes-Lorie (FR); Tommy Plouraboue, Ormes-Loire (FR); Guillaume Vizzutti, Ormes-Loire (FR); Patrick Templier, Ormes-Loire (FR)

(73) Assignee: Honda Motor Co., Ltd. (JP)

( * ) Notice: Subject to any disclaimer, the term of this patent is extended or adjusted under 35 U.S.C. 154(b) by 0 days.

(21) Appl. No.: 11/216,391

(22) Filed: Aug. 31, 2005

(65) Prior Publication Data
US 2006/0042216 A1 Mar. 2, 2006

(30) Foreign Application Priority Data
Sep. 2, 2004 (JP) ............... 2004-255937

(51) Int. Cl.
*A01D 34/00* (2006.01)
(52) U.S. Cl. ............... 56/17.5; 56/255; 56/295; 56/DIG. 17
(58) Field of Classification Search ........... 56/17.5, 56/255, 295, DIG. 17, DIG. 20, 238
See application file for complete search history.

(56) References Cited

U.S. PATENT DOCUMENTS

| | | | | |
|---|---|---|---|---|
| 2,760,327 A | * | 8/1956 | Bovee | 56/13.4 |
| 5,109,656 A | * | 5/1992 | Zimmer | 56/17.5 |
| 5,209,052 A | * | 5/1993 | Carroll | 56/255 |
| 5,259,176 A | * | 11/1993 | Kahamura et al. | 56/255 |
| 5,890,354 A | * | 4/1999 | Bednar | 56/320.1 |
| 5,894,717 A | * | 4/1999 | Yamashita et al. | 56/320.1 |
| 6,487,840 B1 | | 12/2002 | Turner et al. | 56/295 |
| 6,655,119 B2 | * | 12/2003 | Hasei et al. | 56/295 |

FOREIGN PATENT DOCUMENTS

| DE | 4009888 | 10/1990 |
|---|---|---|
| JP | 2516509 | 8/1992 |

* cited by examiner

*Primary Examiner*—Thomas B Will
*Assistant Examiner*—Alicia Torres
(74) *Attorney, Agent, or Firm*—Adams & Wilks

(57) ABSTRACT

A lawn mower having upper and lower cutter blades in a cutter housing is provided. The blades are disposed with a phase difference such that upper blade edge parts of the upper cutter blade are advanced forward with respect to lower blade edges of the lower cutter blade in the rotation direction, whereby interference of the upper cutter blade with the air-lifting parts of the lower cutter blade is avoided, and the noise produced by the rotation of the upper and lower cutter blades is reduced.

13 Claims, 13 Drawing Sheets

MULCHING SYSTEM FOR A LAWN MOWER

FIELD OF THE INVENTION

This invention relates to a lawn mower having two cutter blades in a cutter housing.

BACKGROUND OF THE INVENTION

As working modes of a lawn mower, basically there are the three working modes of mulching work, bagging work, and discharge work.

Mulching work is a working mode in which two cutter blades are provided in a cutter housing, grass is cut with these cutter blades, and finely cut grass cuttings are dispersed on the lawn surface after cutting so that they are inconspicuous.

Bagging work is a working mode in which one cutter blade is provided in the cutter housing, grass is cut with this cutter blade, and the cut grass is received in a grass bag attached to the back of the cutter housing.

Discharge work is a working mode in which one cutter blade is provided in the cutter housing, grass is cut with this cutter blade, and the cut grass is discharged onto the mown lawn surface from the rear of the cutter housing.

A lawn mower made to perform mulching work is proposed in for example Japanese Utility Model Registration No. 2516509.

The lawn mower disclosed in this Japanese Utility Model Registration No. 2516509 will be described below on the basis of FIG. 13 and FIG. 14 hereof.

The lawn mower 240 of related art shown in FIG. 13 has a motive power source 242 mounted on the top of a cutter housing 241. An upper cutter blade 245 for mulching work only and a lower cutter blade 244 for bagging work and discharge work are attached one above the other to the output shaft 243 of the motive power source 242. The lower cutter blade 244 and the upper cutter blade 245 are rotated inside the cutter housing 241 and cut grass.

As shown in FIG. 14, in plan view the upper cutter blade 245 is parallel with and stacked on the lower cutter blade 244. However, the upper cutter blade 245 is positioned close to air-lifting parts 246, 246 of the lower cutter blade 244. Consequently, there has been the shortcoming that as a result of a swirl current and lift current creation function of the air-lifting parts 246, 246, which are for creating a carrying draft in the cutter housing 241, being obstructed, as shown in FIG. 13, the airflows in the vicinities of the air-lifting parts 246, 246 are disrupted and there is a resulting increase in noise.

That is, as shown in FIG. 13, because the air-lifting parts 246, 246 of the lower cutter blade 244 extend above the blade edges of the upper cutter blade 245, the path of the carrying draft is narrowed by the air-lifting parts 246, 246, and the swirl current and lift current creation function is impaired.

Also, as shown in FIG. 14, the phases of the blade edges 247, 247 of the lower cutter blade 244 and the blade edges 248, 248 of the upper cutter blade 245 overlap. Because of this, it sometimes happens that when grass is cut by the upper cutter blade 245, this grass is pushed over (made to lean) in front of the blade edges 248, 248, and this leaned grass is to be cut by the blade edges 247, 247 of the lower cutter blade 244, and the grass cannot be cut with certainty by the lower cutter blade 244.

Accordingly, a lawn mower has been awaited with which it is possible to avoid interference between the lower cutter blade and the upper cutter blade and reduce the noise of these cutter blades.

SUMMARY OF THE INVENTION

The present invention provides a lawn mower having a cutter housing, a motive power source mounted on top of the cutter housing, a lower cutter blade attached rotatably inside the cutter housing and substantially horizontally to the end of the output shaft of the motive power source, and an upper cutter blade attached rotatably inside the cutter housing and substantially horizontally to the output shaft above the lower cutter blade, wherein the lower cutter blade has lower blade edge parts formed at its leading edges in the rotation direction for cutting grass and air-lifting parts for creating a swirl current and a lift current formed behind these lower blade edge parts, the upper cutter blade has upper blade edge parts formed at its leading edges in the rotation direction for cutting grass, and the upper blade edge parts are advanced in phase so that they are positioned forward in the rotation direction with respect to the lower blade edge parts.

Because the upper and lower cutter blades are attached to the output shaft so that the upper blade edge parts are positioned forward of the lower blade edge parts in the rotation direction like this, interference of the upper cutter blade with the air-lifting parts of the lower cutter blade is avoided, and impairment of the swirl current and lift current creation function of the air-lifting parts is prevented. As a result, the noise produced by the rotation of the cutter blades is reduced.

Preferably, the rear edges of the air-lifting parts have a wavy shape. In this case, the swirl current and lift current created by the air-lifting parts are made orderly and the grass can be held in an upright state so that it is easy to cut.

In a preferred form, the upper cutter blade is set to approximately the same height as the rear edges of the air-lifting parts. In this case, interference with the lower cutter blade can be avoided and the height dimension of the cutter housing can be kept to a minimum. As a result, the center of gravity position of the lawn mower can be maintained as noise is reduced.

BRIEF DESCRIPTION OF THE DRAWINGS

Certain preferred embodiments of the present invention will be described in detail below, by way of example only, with reference to the accompanying drawings, in which.

DETAILED DESCRIPTION OF THE PREFERRED EMBODIMENTS

Figure 1:
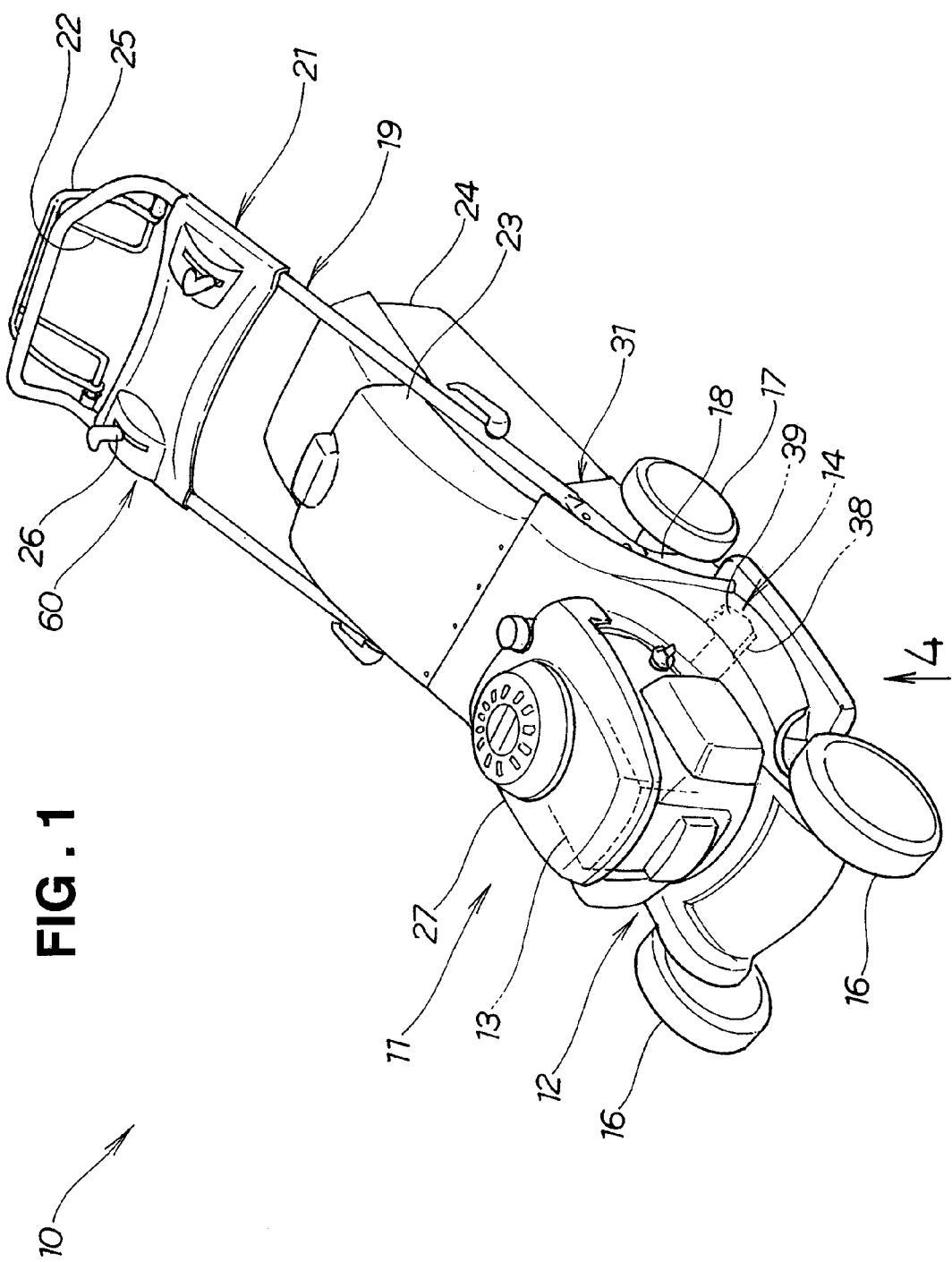
FIG. 1 is a perspective view of a lawn mower using upper and lower cutter blades according to the invention.

A lawn mower 10 constituting a preferred embodiment of the invention shown in FIG. 1 is of a self-propelling type. A cutter blade 14 for cutting grass is rotated by an engine 13, which is a motive power source. Cut grass is collected by being carried from a cutter housing 12 by a carrying draft into a grass bag 24. Rear wheels 17 are driven by the engine 13.

In the figure, the reference number 11 denotes a machine body; 16 front wheels; 18 handle stays; 19 a handle; 21 a handle cover extending across the handle 19; 22 a clutch lever for travel, which clutch-controls motive power transmission from the engine 13 to the rear wheels 17; 23 a grass cover; 25 a clutch lever for clutch-controlling rotational power to the cutter blade 14; 26 a lock lever; 27 a head cover; and 60 a lock mechanism.

The clutch lever 25 is a lever that simultaneously performs an operation of applying a brake to the cutter blade 14 while stopping the driving of the cutter blade 14, and is sometimes called a BBC control lever because it controls a blade, a brake and a clutch.

Figure 2:
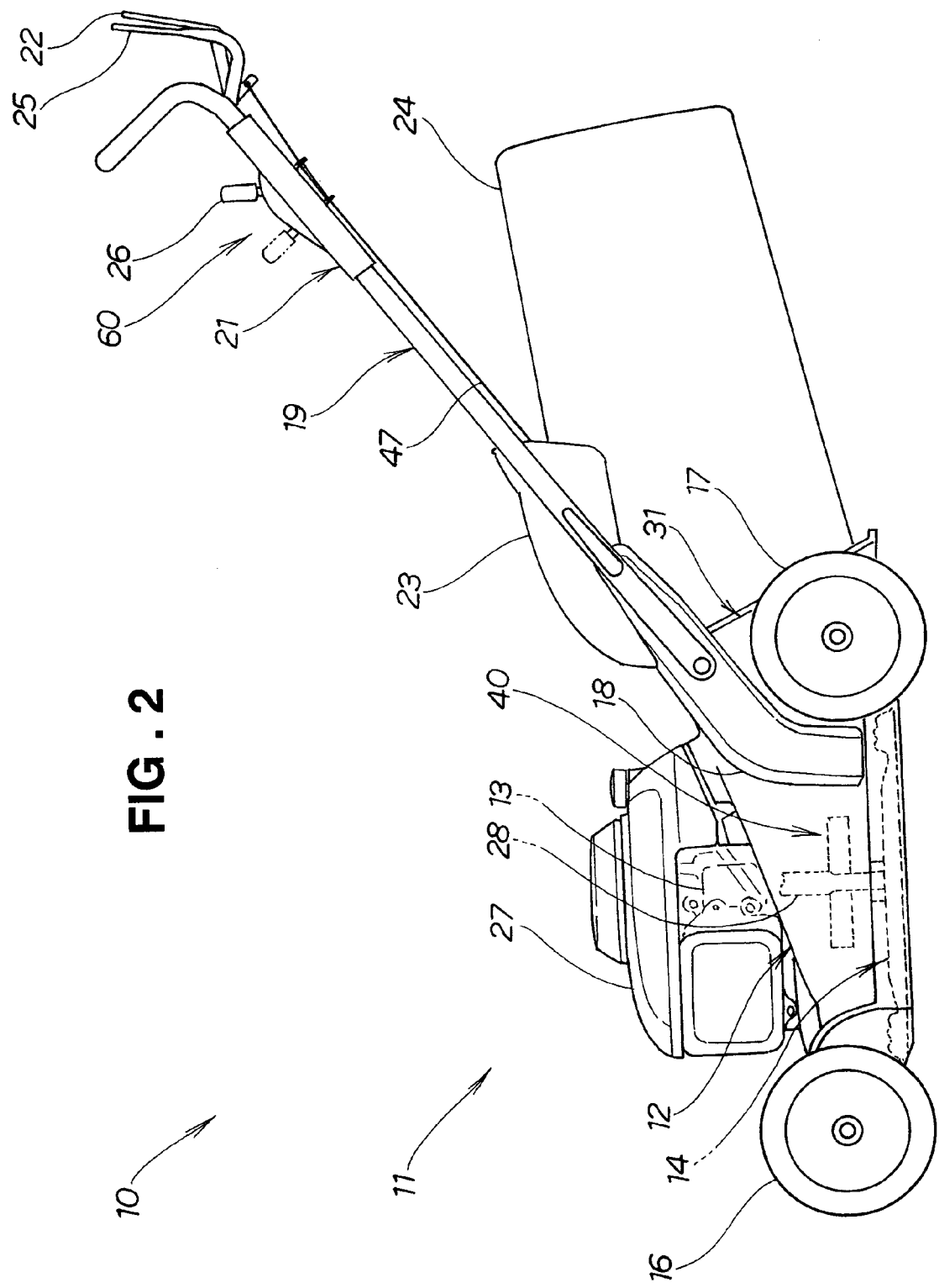
FIG. 2 is a side view of FIG. 1.

As shown in FIG. 2, the engine 13 of the lawn mower 10 is mounted on the top of the cutter housing 12. The cutter blade 14 is attached to the output shaft 28 of the engine 13 by way of a clutch mechanism 40. The left and right front wheels 16 are disposed at side faces of the front part of the cutter housing 12, and the left and right rear wheels 17 are disposed at side faces of the rear part of the cutter housing 12. Left and right handle stays 18 are attached to the side faces of the rear part of the cutter housing 12. The handle 19 extends rearward from the rear parts of these handle stays 18, 18. The clutch lever 25 is mounted on this handle 19 and controls the clutch mechanism 40. The lock lever 26 is mounted in front of the clutch lever 25 and bars an engaging function of the clutch lever. The grass bag 24 is removably attached to a rear wall 31 of the cutter housing 12. A grass cover 23 is swingably attached to an upper part of the rear wall 31 of the cutter housing 12.

The grass bag 24 is made of a porous material having plural air holes (not shown) through which only the carrying draft can pass but grass cuttings cannot pass.

Figure 3:
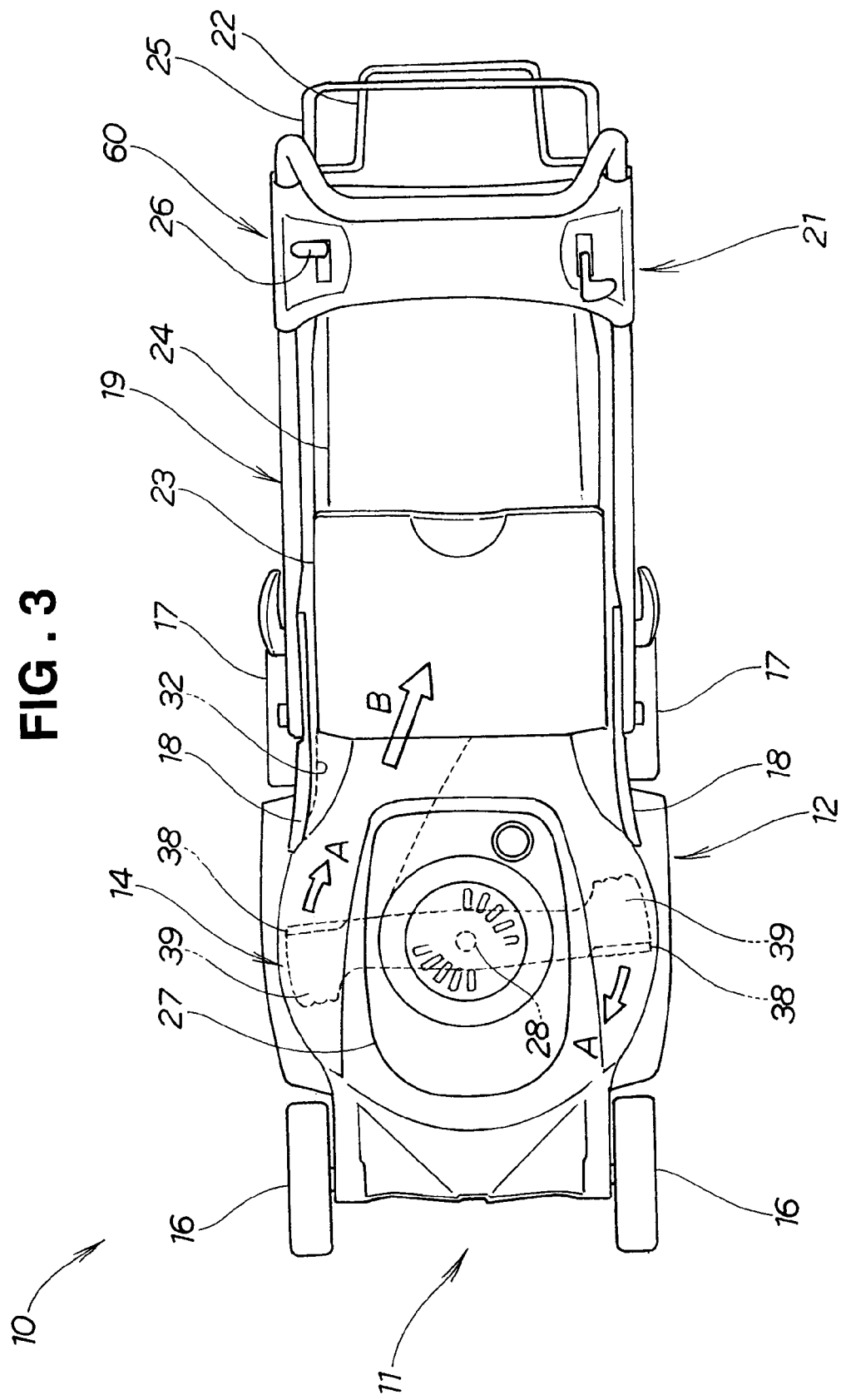
FIG. 3 is a plan view of FIG. 1.

As shown in FIG. 3, with the engine 13 (see FIG. 2) started, the clutch mechanism 40 of the lawn mower 10 (see FIG. 2) is switched from an off state to an engaged state by a two-stage motion of shifting the clutch lever 25 to the handle 19 side and then shifting the lock lever 26 forward, to rotate the cutter blade 14, and the clutch lever for travel 22 is shifted to the handle 19 side to rotate the rear wheels 17, 17.

The cutter blade 14 has blade parts 38, 38 on its leading sides in the rotation direction shown with the arrows A, A, and from these blade parts 38, 38 on its trailing sides in the rotation direction it has air-lifting parts 39, 39 formed so as to curve upward.

That is, as the cutter blade 14 rotates, grass on the ground surface is caused to stand up by a negative pressure arising on the undersides of the air-lifting parts 39, 39, and the grass is cut by the blade parts 38, 38. The cut grass is hit by the upper sides of the air-lifting parts 39, 39 and caught by a swirling airflow created by the rotation of the cutter blade 14, and with this swirling airflow as a carrying draft the grass cuttings are fed together with the carrying draft through a cut grass carrying passage 32 into the grass bag 24 as shown by the arrow B.

Figure 4:
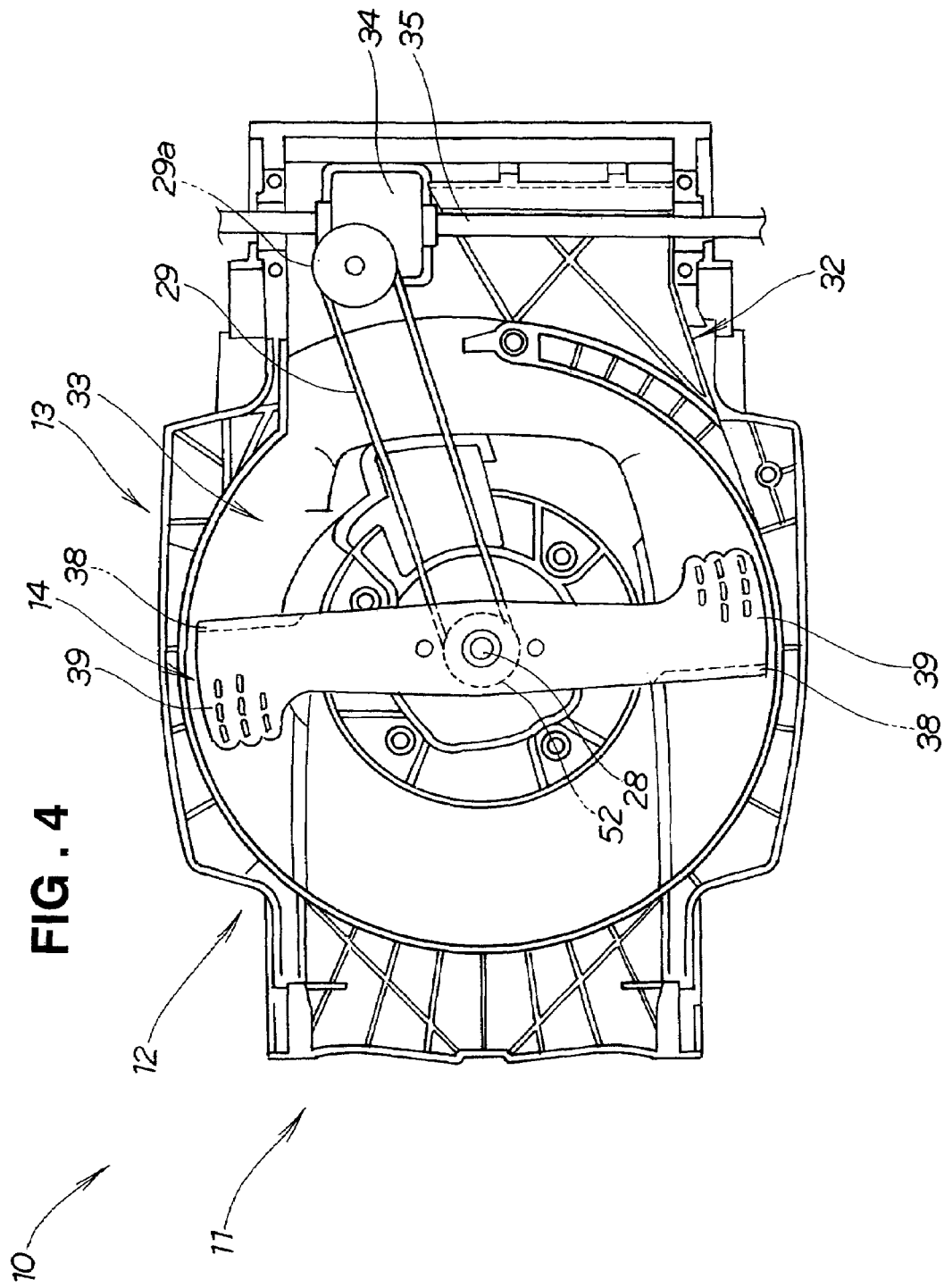
FIG. 4 is a view in the direction of the arrow 4 in FIG. 1.

FIG. 4 shows the underside of the lawn mower 10.

The cutter blade 14 is covered by the cutter housing 12. The cut grass carrying passage 32 for guiding cut grass into the grass bag 24 (see FIG. 2) is formed in the cutter housing 12. This cut grass carrying passage 32 connects with the grass bag 24.

The reference number 29 denotes a power-transmitting part (a belt); 33 a scroll part provided in the cutter housing 12 for rotatably receiving the cutter blade 14; 52 a drive pulley; 34 a clutch for travel; and 35 a rear wheel axle.

In the lawn mower 10, the output of the engine 13 is transmitted from the drive pulley 52 of the output shaft 28 to a driven pulley 29a by the belt 29, and by way of the driven pulley 29a and the clutch for travel 34 the output of the engine 13 is transmitted to the rear wheel axle 35 and drives the rear wheels 17, 17 (see FIG. 3).

Figure 5:
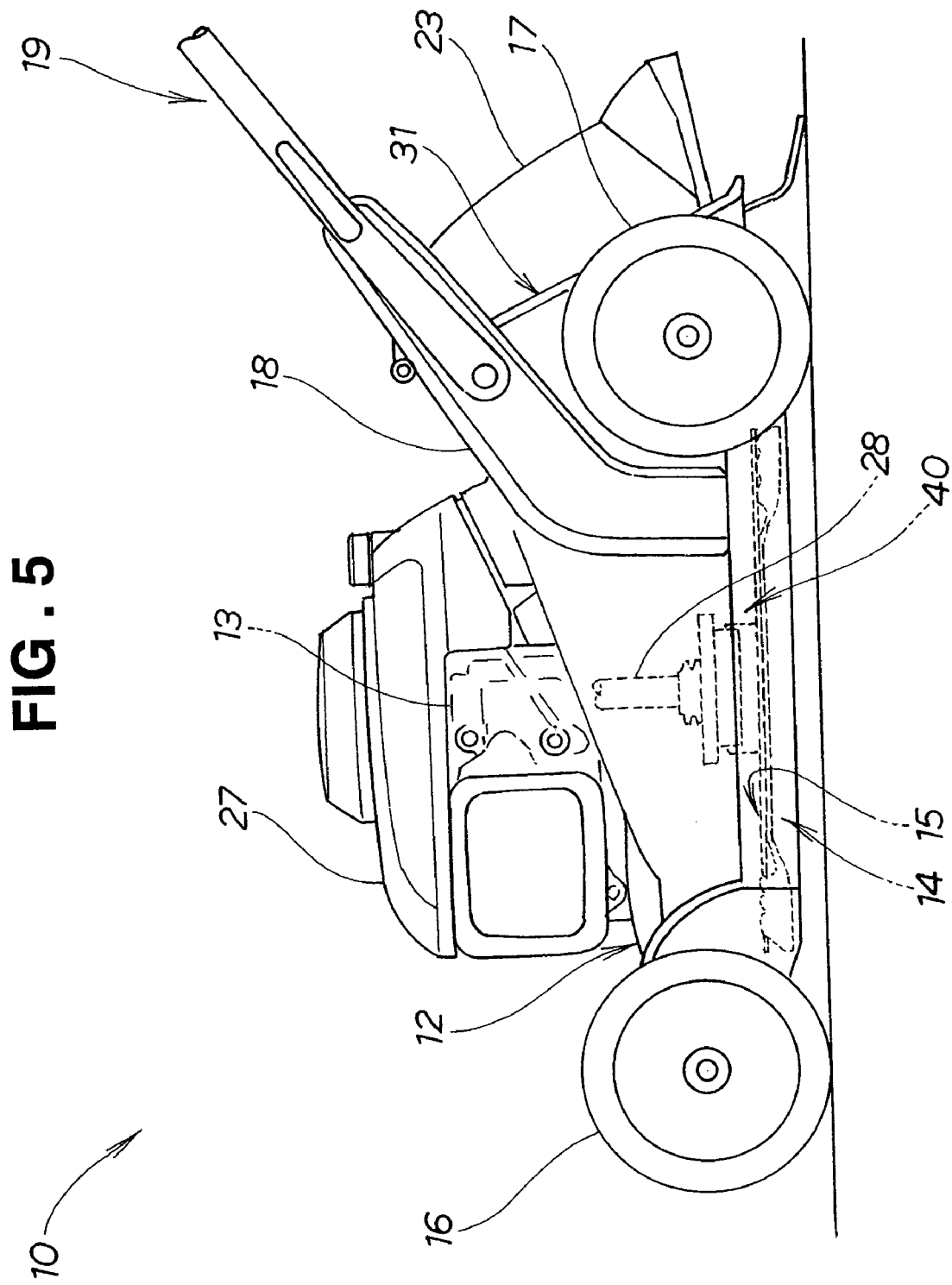
FIG. 5 is a side view showing a mulching work state of the lawn mower shown in FIG. 1.

FIG. 5 shows a mulching work state of the lawn mower. Mulching work (mulching mode) is a working mode in which two cutter blades are provided in the cutter housing, grass is cut with these cutter blades, and finely cut grass cuttings are dispersed on the lawn surface (ground surface) so that they are inconspicuous. Mulching work is an alternative mode of discharge work, discussed below.

Discharge work (discharge mode) is a working mode in which grass is cut with one cutter blade, and the cut grass is made to pass through the cut grass carrying passage and discharged outside through the grass cover.

Bagging work (bagging mode) is a working mode in which grass is cut with one cutter blade and the cut grass is made to pass through the cut grass carrying passage and collected in the grass bag.

That is, the lawn mower 10 of this preferred embodiment is capable of mulching work, discharge work and bagging work (see FIG. 2). When mulching work is to be done, an upper cutter blade 15 for mulching work is fitted to the output shaft 28 of the engine 13 along with a lower cutter blade 14 for discharge work and bagging work, and a closing member (not shown) is placed in the cut grass carrying passage 32 (see FIG. 4) to perform an operation.

Figure 6:
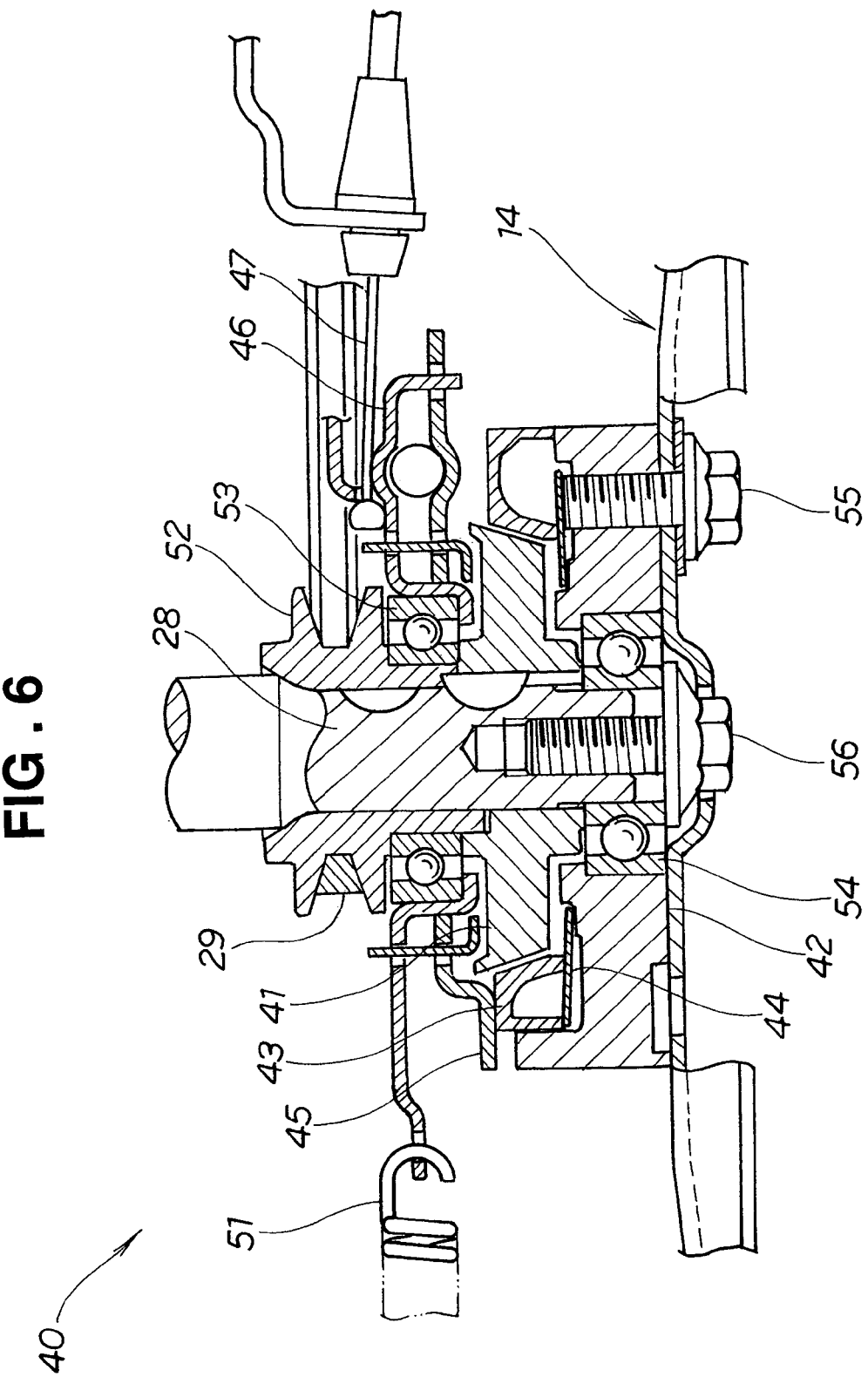
FIG. 6 is a sectional view of a clutch mechanism shown in FIG. 2.

FIG. 6 is a sectional view of the clutch mechanism 40 shown in FIG. 2.

The clutch mechanism (clutch/brake mechanism) 40 is made up of an input hub (drive-side hub) 41 mounted on the engine output shaft 28; an output hub (driven-side hub) 42, contactable with and partible from the input hub 41 and having the cutter blade 14 mounted to it; a friction plate 43, interposed between the input hub 41 and the output hub 42, that moves up and down along the axis of the output shaft 28; a plate spring 44, interposed between this friction plate 43 and the output hub 42, for urging the friction plate 43 toward the input hub 41; a brake plate 45 for separating and contacting the friction plate 43 and the input hub 41 and stopping the rotation of the friction plate 43 and the input hub 41; and a control plate 46 for raising and lowering the brake plate 45.

That is, the clutch mechanism 40 has a clutch function for connecting or cutting off the rotation of the engine 13 to/from the cutter blade 14 and a brake function for allowing or stopping rotation of the cutter blade 14.

One end of a cable 47 is connected to the control plate 46, the other end of the cable 47 is connected to the clutch lever 25 via the lock mechanism 60 as shown in FIG. 2, and the clutch mechanism 40 is thereby remotely controlled.

In FIG. 6, the reference number 51 denotes a coil spring attached to the control plate 46; 52 a pulley, attached to the output shaft 28, for transmitting rotation of the engine 13 to the rear wheels 17, 17 (see FIG. 3) via the motive power transmitting part 29 (see FIG. 4); 53 a bearing interposed between the output shaft 28 and the input hub 41; 54 a bearing interposed between the output hub 42 side and the control plate 46/brake plate 45; 55 bolts for fixing the cutter blade 14 to the output hub 42; and 56 a bolt for fixing the input hub 41 and the bearings 53, 54 en bloc to the output shaft 28.

Figure 7A:
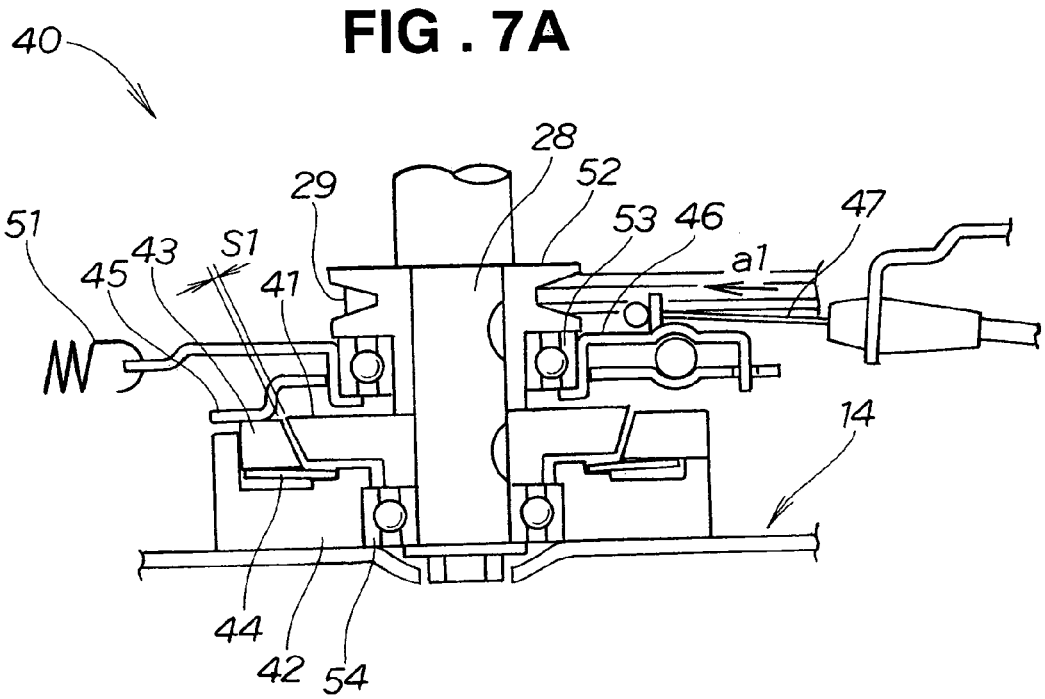
FIG. 7A and FIG. 7B are views illustrating the operation of the clutch mechanism shown in FIG. 6.
Figure 7B:
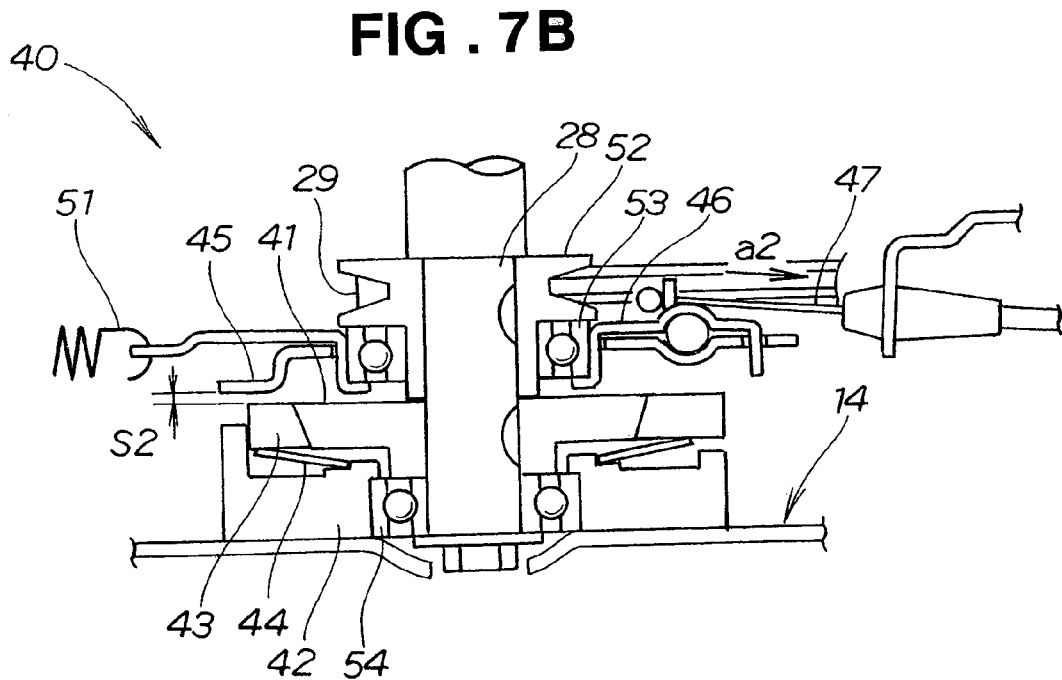

FIG. 7A and FIG. 7B illustrate the operation of the clutch mechanism 40 shown in FIG. 6, FIG. 7A showing a clutch-disengaged state and FIG. 7B showing a clutch-engaged state.

In FIG. 7A, by the cable 47 being let out as shown by the arrow a1, the friction plate 43 is pushed by the brake plate 45, this friction plate 43, the plate spring 44 and the output hub 42 are stopped and a brake is applied to the cutter blade 14, and a space S1 is created between the friction plate 43 and the input hub 41 so that the output hub 42 is isolated from the input hub 41.

In FIG. 7B, by the cable 47 being pulled as shown by the arrow a2, the brake plate 45 is released from the friction plate 43, a space S2 is created between the friction plate 43 and the brake plate 45, and the friction plate 43 is engaged with the input hub 41 and the rotation of the output shaft 28 is transmitted in order from the input hub 41 to the friction plate 43, the plate spring 44, the output hub 42 and the cutter blade 14.

Figure 8:
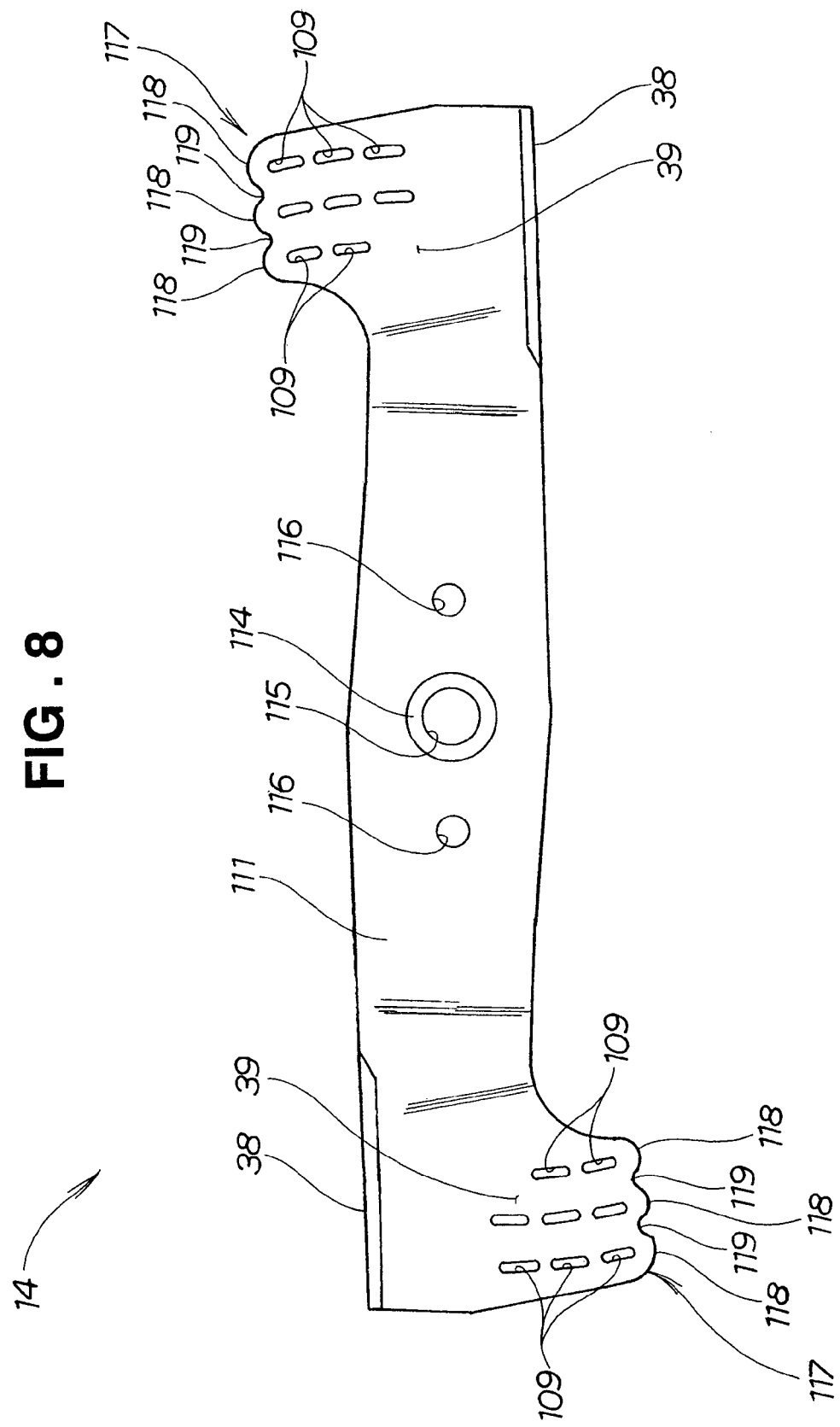
FIG. 8 is a plan view of a lower cutter blade according to the invention shown in FIG. 5.

FIG. 8 shows the lower cutter blade 14 shown in FIG. 5. The lower cutter blade 14 is used for the bagging mode and the discharge mode (see FIG. 5).

The lower cutter blade 14 has blade edge parts 38, 38 (hereinafter called the lower blade edges 38, 38), for cutting grass, formed at the leading edges in the rotation direction of end parts of a lower blade proper 111, and air-lifting parts 39, 39 formed in recrions behind the lower blade edges 38, 38 for creating a swirl current and a lift current.

A bolt-accommodating recess 114 and a bolt-accommodating hole 115 for accommodating the head of the bolt 56 (see FIG. 6) are formed in the center of the lower blade proper 111. The lower cutter blade 14 is attached to the output hub 42 of the clutch mechanism 40 by the bolts 55, 55 as shown in FIG. 6 through fixing holes 116, 116 formed in the lower blade proper 111.

The air-lifting parts 39 have multiple protrusions 118 and depressions 119 in the form of a wave formed in their trailing edges 117 to make the swirl currents and lift currents orderly which are created by the air-lifting parts 39, and multiple long holes 109 formed to relieve the negative pressure arising on the underside of the air-lifting parts 39, 39.

By the trailing edges 117 of the air-lifting parts 39 each being formed in a wave shape, the swirl currents and lift currents created by the air-lifting parts 39 are made orderly and the grass is made to stand up so that it is easy to cut.

By the multiple long holes 109 being formed in the air-lifting parts 39, the occurrence of eddy currents arising due to the negative pressure on the undersides of the air-lifting parts 39, 39 is prevented, and noise resulting from rotation is reduced.

Figure 9:
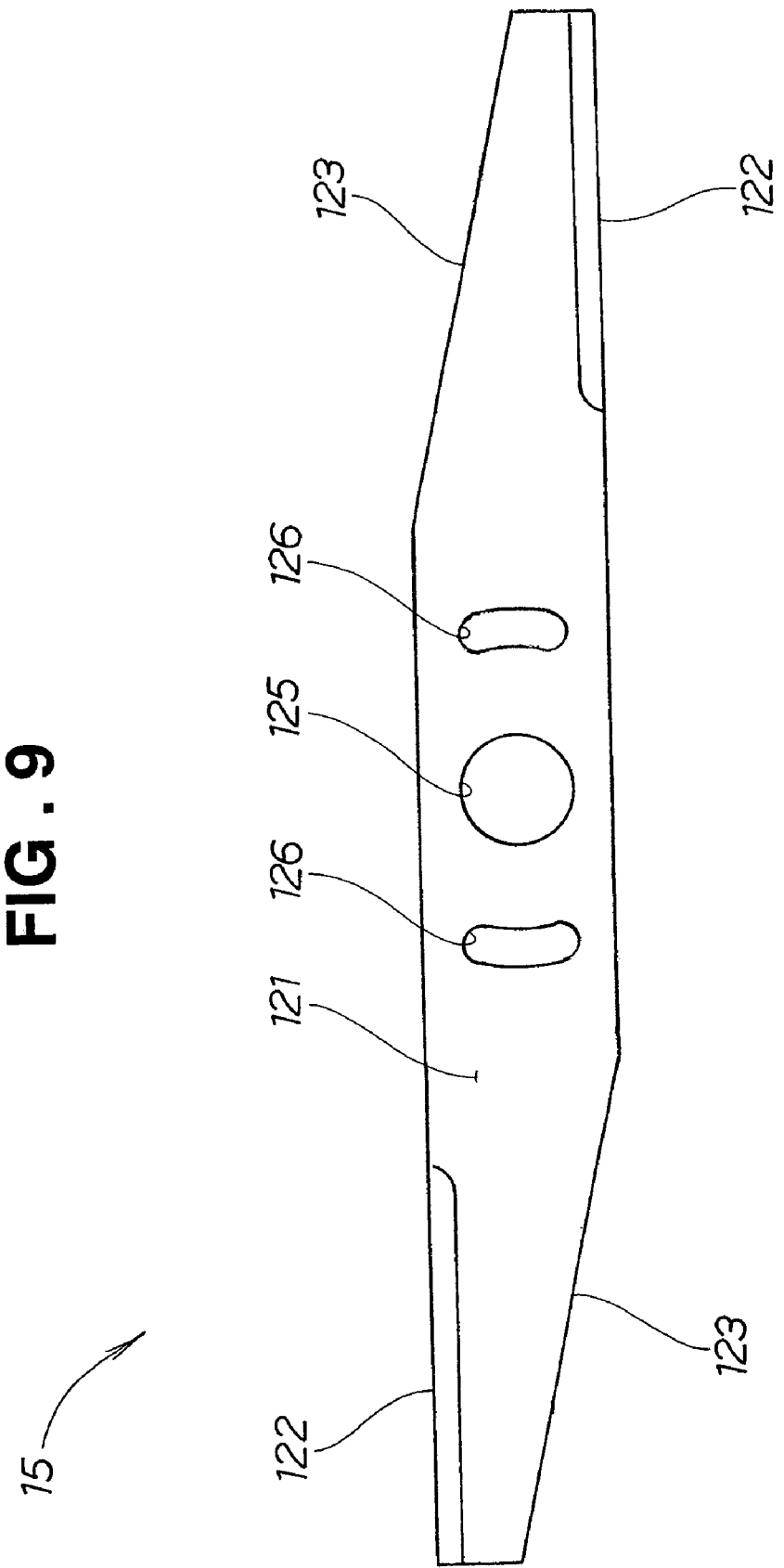
FIG. 9 is a plan view of an upper cutter blade according to the invention shown in FIG. 5.

FIG. 9 shows the upper cutter blade 15 shown in FIG. 5. The upper cutter blade 15 is used together with the lower cutter blade 14 for the mulching mode explained with reference to FIG. 5.

Figure 10:
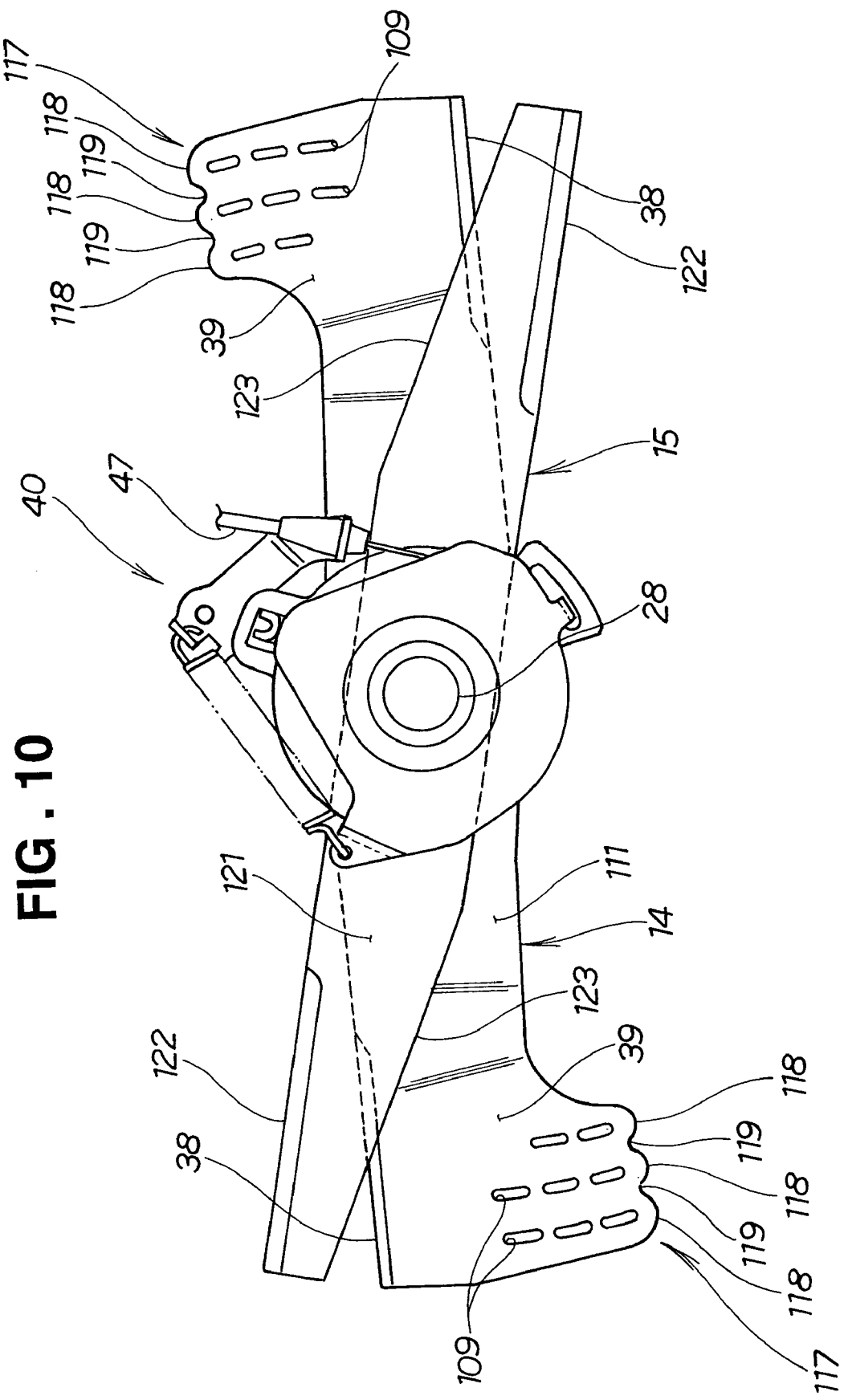
FIG. 10 is a plan view showing the upper and lower cutter blades shown in FIG. 8 and FIG. 9 in their mounted state.
Figure 11:
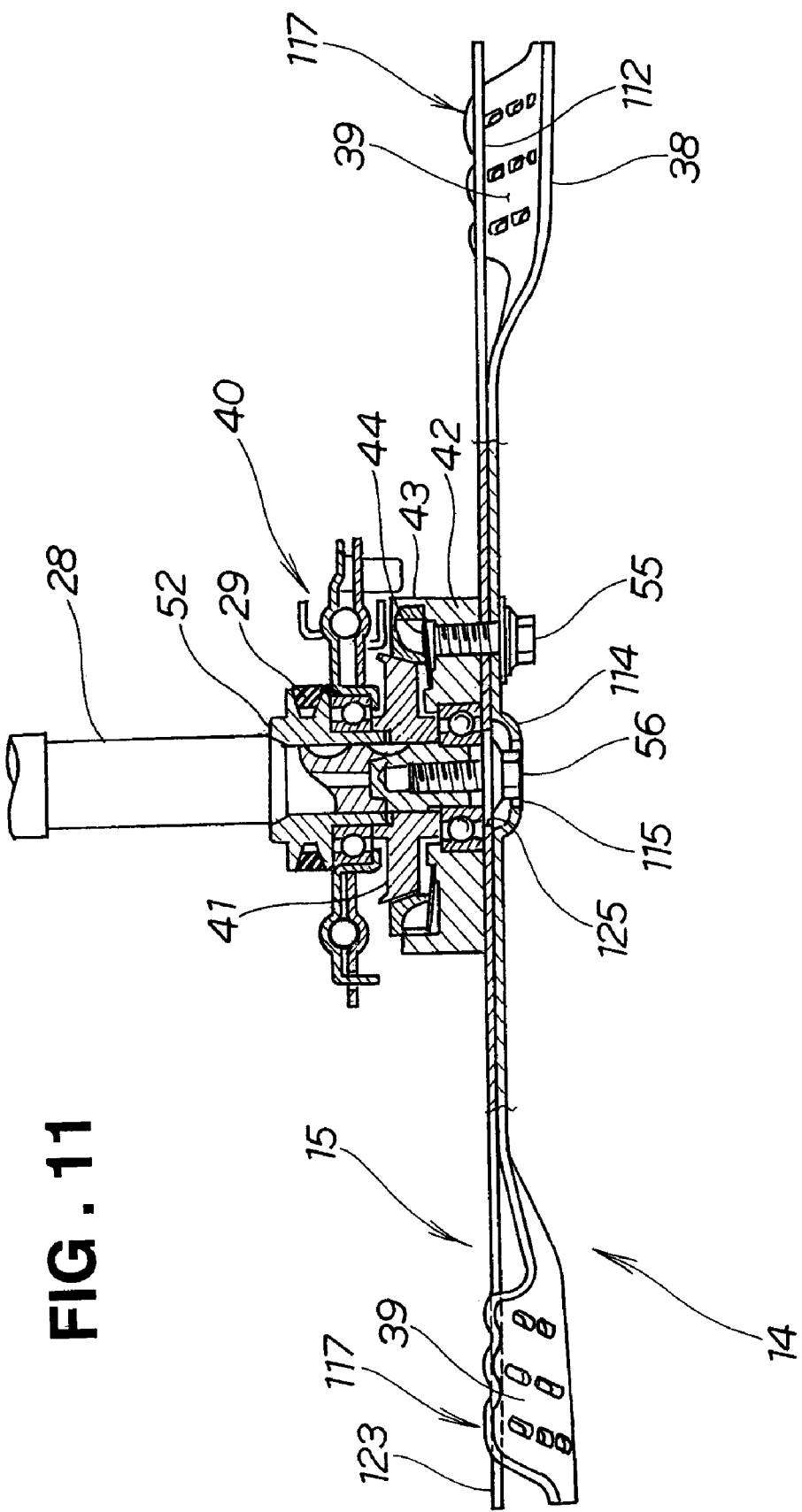
FIG. 11 is a partially sectional view of the upper and lower cutter blades mounted to the clutch mechanism.

The upper cutter blade 15 has upper blade edges 122, 122, for cutting grass, formed at the leading edges in the rotation direction of end parts of an upper blade proper 121, and straight trailing edges defining clearance parts 123, 123 formed by the blade width tapering toward the ends behind these upper blade edges 122, 122 to avoid interference with the air-lifting parts 39, 39 (see FIG. 8). As shown in FIGS. 9-11, the upper cutter blade 15 is free of air-lifting parts, such as the air-lifting parts 39, 39 found on the lower cutter blade 14.

A bolt-accommodation hole 125 for accommodation the head of the bolt 56 (see FIG. 6) is formed in the center of the upper blade proper 121. The upper cutter blade 15 is co-fastened with the lower cutter blade 14 to the output hub 42 of the clutch mechanism 40 by the bolts 55, 55 (see FIG. 6) passing through circular-arc-shaped holes 126, 126 formed in the upper blade proper 121. At this time, the circular-arc-shaped holes 126, 126 make it possible to adjust the mounting angle of the upper blade proper 121, so that the mounting angle of the upper cutter blade 15 with respect to the lower cutter blade 14 (see FIG. 8) can be adjusted.

FIG. 10 shows the mounted state of the upper and lower cutter blades. Referring to FIG. 10, the upper and lower cutter blades 15, 14 are attached to the output shaft 28 so that with respect to the lower blade edges 38 the upper blade edges 122 are positioned forward a prescribed phase angle $\theta$ (FIG. 12) in the rotation direction of the cutter blades 14, 15. That is, the upper blade edges 122 are disposed with their phase advanced forward with respect to the lower blad edges 38.

Consequently, interference of the upper cutter blade 15 with the air-lifting parts 39 of the lower cutter blade 14 is avoided, and impairment of the swirl current and lift current creation function of the air-lifting parts 39 is prevented. As a result, reduction of the noise of the cutter blades 14, 15 can be achieved.

The clearance parts 123, 123 of the upper cutter blade 15 are set to a range (overlapping position) such that in plan view they intersect with the lower blade edges 38, 38 of the lower cutter blade 14. The clearance parts 123 are parts for avoiding obstruction of the swirl current creation function of the air-lifting parts 39, and when the range over which the cutter blades 14, 15 intersect is set unnecessarily large, the unity of the upper cutter blade 15 and the lower cutter blade 14 is low and rotation noise increases. Accordingly, by the clearance parts 123, 123 and the lower blade edges 38, 38 being set to intersect as mentioned above, increasing of rotation noise can be suppressed.

When the phase of the lower blade edges 38, 38 of the lower cutter blade 14 and the upper blade edges 122, 122 of the upper cutter blade 15 is small, when grass is cut by the upper cutter blade 15, this grass is pushed over forward so as to lean by the upper blade edges 122, 122. And when the lower blade edges 38, 38 of the lower cutter blade 14 cut this leaned grass, the lower cutter blade 14 cannot certainly cut the grass.

Accordingly, by the upper blade edges 122, 122 of the upper cutter blade 15 being disposed to shift with respect to the lower blade edges 38, 38 of the lower cutter blade 14, first the grass is cut with the upper cutter blade 15 and then the remaining grass is cut with the lower blade edges 38, 38 of the lower cutter blade 14. And also, any uncut grass still remaining is returned to the vertical by the negative pressure arising on the undersides of the air-lifting parts 39, 39. As a result, the lawn surface can be evenly cut to a predetermined height.

FIG. 11 shows the upper and lower cutter blades 15, 14 mounted to the clutch mechanism 40.

The upper cutter blade 15 is set to approximately the same height as the trailing edges 117 of the air-lifting parts 39, 39. Consequently, as well as interference with the lower cutter blade 14 being avoided, the height dimension of the cutter housing 12 is kept to a minimum and the gravity position of the lawn mower 10 (see FIG. 5) can be maintained as noise is reduced.

Figure 12:
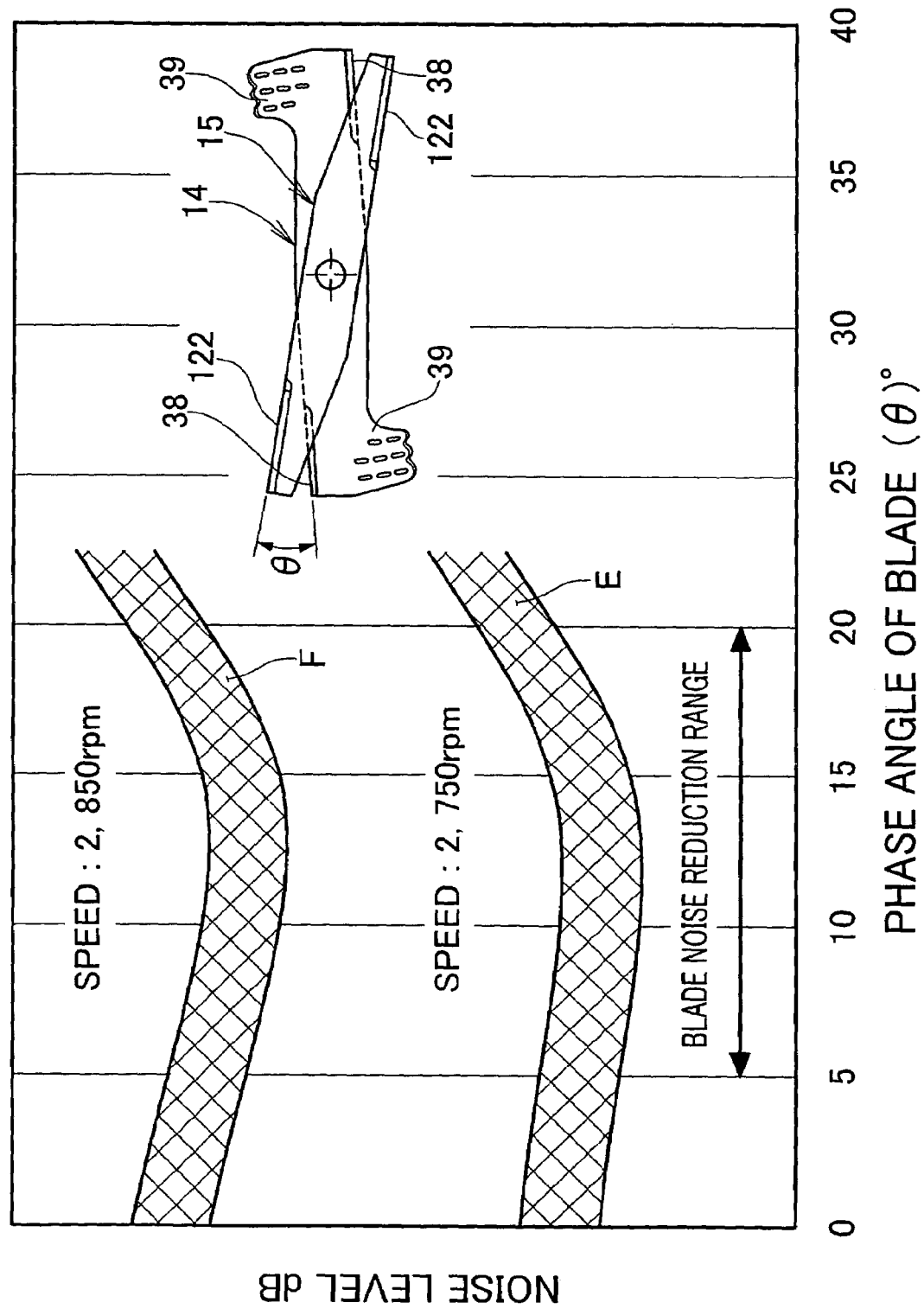
FIG. 12 is a graph showing changes in noise level with changes in phase angle of upper and lower cutter blades according to the invention.
Figure 13:
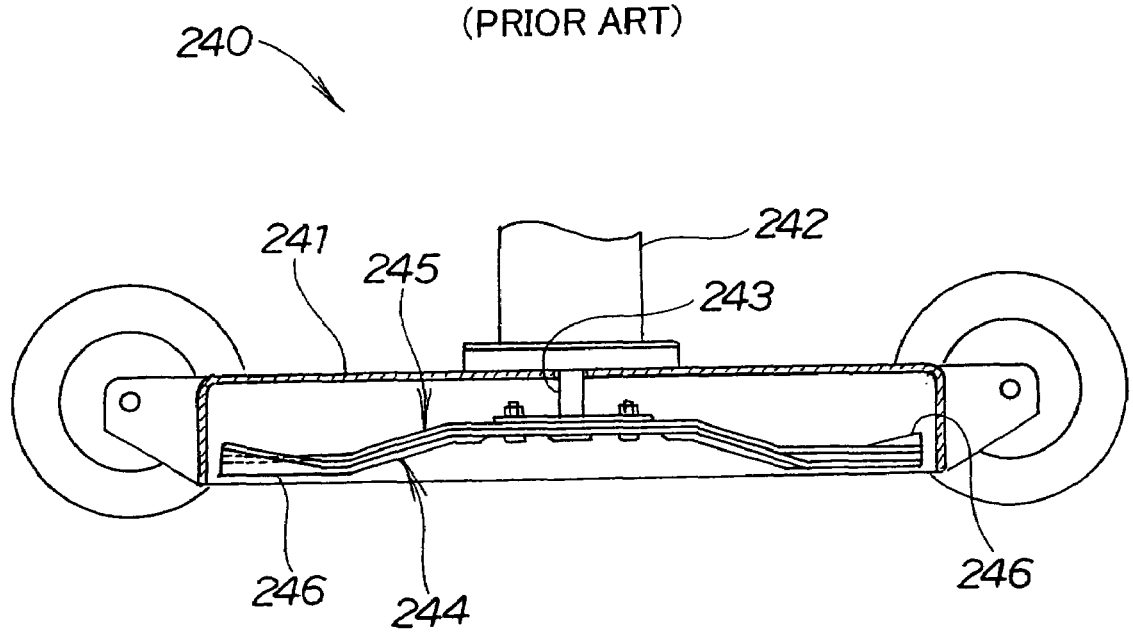
FIG. 13 is a view showing part of a lawn mower of related art having upper and lower cutter blades.
Figure 14:
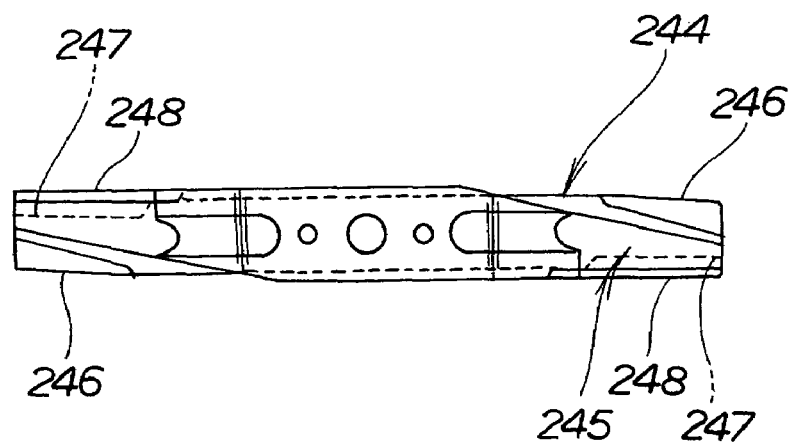
FIG. 14 is a plan view of the upper and lower cutter blades of related art shown in FIG. 13.

FIG. 12 shows a graph of noise level vs. phase angle $\theta$ of the blade edges 122, 38 of the upper and lower cutter blades 15, 14. It can be seen from this graph that as the phase angle $\theta$ of the blade edges 122, 38 changes, the noise level also changes.

The noise level range E shows the noise level when the speed of the upper and lower cutter blades 15, 14 has been set to 2,750 rpm, and the noise level F shows the noise level when the speed of the upper and lower cutter blades 15, 14 has been set to 2,850 rpm. Although the noise reduction effect differs according to the speed of the cutter blades 14, 15, whereas the phase angle θ starts at 0° and continues as far as 20°, the phase angle θ is preferably 5 to 20°. In particular, because the noise level is at a minimum when the phase angle θ is about 12° to 13°, it is more preferably set in the range 10 to 15°.

For example, because when the phase angle of the upper blade edges 122 with respect to the lower blade edges 38 is small the upper cutter blade 15 interferes with the lower cutter blade 14, the noise of the rotation of these cutter blades 14, 15 increases. And because when the phase angle θ of the upper blade edges 122 with respect to the lower blade edges 38 is large the singleness of the upper and lower cutter blades 14, 15 is lost, again the noise (wind noise) of the upper and lower cutter blades 14, 15 increases. Accordingly, it is possible to achieve a decrease in the noise by setting the phase angle θ of the upper blade edges 122 with respect to the lower blade edges 38 to 5 to 20°.

Although in the foregoing preferred embodiment an example was shown in which straight clearance parts 123, 123 were formed on the upper cutter blade 15 as shown in FIG. 10, the invention is not limited to this, and alternatively the clearance parts may be curved or wavy.

Obviously, various minor changes and modifications of the present invention are possible in the light of the above teaching. It is therefore to be understood that within the scope of the appended claims the invention may be practiced otherwise than as specifically described.

What is claimed is:

1. A lawn mower comprising:
a cutter housing;
a motive power source mounted on the cutter housing, the motive power source having a rotationally driven output shaft;
a lower cutter blade attached rotatably inside the cutter housing and substantially horizontally to an end of the output shaft of the motive power source;
an upper cutter blade attached rotatably inside the cutter housing and substantially horizontally to the output shaft above the lower cutter blade; and
means for mounting the lower and upper cutter blades to the output shaft to enable angular adjustment of the two blades relative to each other about the output shaft, the means for mounting including arc-shaped holes formed in the upper cutter blade, fixing holes formed in the lower cutter blade and aligned with respective ones of the arc-shaped holes, and bolts extending through respective pairs of aligned arc-shaped holes and fixing holes to fasten the upper and lower cutter blades together;
wherein the lower cutter blade has lower blade edge parts formed at leading edges thereof in the rotation direction for cutting grass and air-lifting parts formed at regions thereof behind the lower blade edge parts for creating a swirl current and a lift current,
the upper cutter blade has upper blade edge parts formed at leading edges thereof in the rotation direction for cutting grass and straight clearance parts formed at regions thereof behind the upper blade edge parts to avoid interference with the air-lifting parts, is free of air-lifting parts at trailing edges thereof, and is set approximately at the same height as rear edges of the air-lifting parts of the lower cutter blade,
the upper blade edge parts are advanced in phase and positioned forward a prescribed phase angle in the rotation direction with respect to respective lower blade edge parts, and
the straight clearance parts of the upper cutter blade converge toward the respective upper blade edge parts so that the width of the upper cutter blade progressively reduces toward opposite ends thereof, the straight clearance parts intersecting with respective ones of the lower blade edge parts of the lower cutter blade when viewed in plan view.

2. A lawn mower according to claim 1; wherein the rear edges of the air-lifting parts have a wavy shape.

3. In a lawn mower having a rotationally driven output shaft extending downwardly into a cutter housing: a lower cutter blade connected to a lower end of the output shaft to be rotationally driven thereby; an upper cutter blade connected to the output shaft, above the lower cutter blade, to be rotationally driven thereby; and means for mounting the lower and upper cutter blades to the output shaft to enable angular adjustment of the two blades relative to one another about the output shaft, the means for mounting including arc-shaped holes formed in the upper cutter blade, fixing holes formed in the lower cutter blade and aligned with respective ones of the arc-shaped holes, and bolts extending through respective pairs of aligned arc-shaped holes and fixing holes to fasten the upper and lower cutter blades together; wherein the lower cutter blade has lower blade edge parts at leading edges thereof in the rotation direction for cutting grass and air-lifting parts at regions thereof behind the lower blade edge parts for creating a swirl current and a lift current, the upper cutter blade has upper blade edge parts at leading edges thereof in the rotation direction for cutting grass and is free of air-lifting parts at regions thereof behind the upper blade edge parts, the upper blade edge parts are positioned forward at an adjustable phase angle in the rotation direction with respect to respective lower blade edge parts, and the upper cutter blade is set approximately at the same height as rear edges of the air-lifting parts and has straight clearance parts formed behind the respective upper blade edge parts to avoid interference with the air-lifting parts of the lower cutter blade, the straight clearance parts converging toward the upper blade edge parts so that the width of the upper cutter blade progressively reduces toward opposite ends thereof, the straight clearance parts intersecting with respective ones of the lower blade edge parts of the lower cutter blade when viewed in plan view.

4. A lawn mower according to claim 3; wherein the air-lifting parts of the lower cutter blade are provided with multiple holes to relieve negative pressure arising on the undersides of the air-lifting parts.

5. A lawn mower according to claim 4; wherein the multiple holes are elongate in the rotation direction of the lower cutter blade.

6. A lawn mower according to claim 4; wherein the phase angle is in the range 5°-20°.

7. A lawn mower according to claim 4; wherein the phase angle is in the range 10°-15°.

8. A lawn mower according to claim 4; wherein the trailing edges of the air-lifting parts have a wavy shape.

9. A lawn mower according to claim 3; wherein the phase angle is in the range 5°-20°.

10. A lawn mower according to claim 3; wherein the phase angle is in the range 10°-15°.

11. A lawn mower according to claim 3; wherein the trailing edges of the air-lifting parts have a wavy shape.

12. A lawn mower according to claim 1; further including a clutch mechanism having an input hub connected to be rotationally driven by the output shaft, and an output hub engageable with the input hub and to which are fastened the bolts.

13. A lawn mower according to claim 3; further including a clutch mechanism having an input hub connected to be rotationally driven by the output shaft, and an output hub engageable with the input hub and to which are fastened the bolts.

* * * * *